United States Patent
Homner

(10) Patent No.: US 11,261,636 B2
(45) Date of Patent: Mar. 1, 2022

(54) HINGE HAVING A TENSIONABLE SPRING ELEMENT

(71) Applicant: S-Fasterners GmbH, Althengsteet (DE)

(72) Inventor: Bernard Homner, Calw-Stammheim (DE)

(73) Assignee: S-FASTENERS GMBH, Althengstett (DE)

( * ) Notice: Subject to any disclaimer, the term of this patent is extended or adjusted under 35 U.S.C. 154(b) by 18 days.

(21) Appl. No.: 16/754,134

(22) PCT Filed: Sep. 11, 2018

(86) PCT No.: PCT/EP2018/074441
§ 371 (c)(1),
(2) Date: Apr. 6, 2020

(87) PCT Pub. No.: WO2019/068432
PCT Pub. Date: Apr. 11, 2019

(65) Prior Publication Data
US 2020/0332580 A1    Oct. 22, 2020

(30) Foreign Application Priority Data

Oct. 6, 2017    (DE) .......................... 202017106060.8

(51) Int. Cl.
*E05D 7/00*    (2006.01)
*E05F 1/12*    (2006.01)
(Continued)

(52) U.S. Cl.
CPC ........ *E05F 1/1207* (2013.01); *E05D 11/0054* (2013.01); *E05D 11/06* (2013.01);
(Continued)

(58) Field of Classification Search
CPC ... F16F 15/03; F16F 6/00; F16F 6/005; F24C 15/02; F24C 15/023; E05F 1/1207;
(Continued)

(56) References Cited

U.S. PATENT DOCUMENTS 2,072,094 A * 3/1937 Bommer ............... E05F 1/1215
                                                    16/299
2,078,815 A * 4/1937 Segar ....................... E05D 3/022
                                                    16/286

(Continued)

FOREIGN PATENT DOCUMENTS

CN    2540486 Y    3/2003
CN    201062478 Y    5/2008
(Continued)

OTHER PUBLICATIONS

Transmittal of International Preliminary Report on Patentability or PCT/EP2018/07441, filed Sep. 11, 2018, dated Apr. 8, 2020, 8 pages.
(Continued)

*Primary Examiner* — Chucky Y Mah
(74) *Attorney, Agent, or Firm* — Womble Bond Dickinson (US) LLP; Joseph Bach, Esq.

(57) ABSTRACT

The invention relates to a hinge (10) comprising a swivellable hinge part (12), a stationary hinge part (14) and a tensionable spring element (34), wherein the stationary hinge part (14) is designed with a first bearing (16) as well as a second bearing (18), wherein the bearings (16, 18) have swivel axes (S1, S2) that are offset to one another. According to the invention, the swivellable hinge part (12) is mounted on the stationary hinge part (14) via the first bearing (16) such that it can swivel about a swivel axis (S1), and the tensionable spring element (34) is arranged on the stationary hinge part (14) via the second bearing (18).

7 Claims, 7 Drawing Sheets

(51) Int. Cl.
*E05D 11/00* (2006.01)
*E05D 11/06* (2006.01)
*B64D 11/00* (2006.01)
*E05F 3/20* (2006.01)

(52) U.S. Cl.
CPC .............. *B64D 11/003* (2013.01); *E05F 3/20* (2013.01); *E05Y 2201/10* (2013.01); *E05Y 2201/212* (2013.01); *E05Y 2201/224* (2013.01); *E05Y 2201/25* (2013.01); *E05Y 2201/422* (2013.01); *E05Y 2201/484* (2013.01); *E05Y 2201/712* (2013.01); *E05Y 2900/502* (2013.01); *E05Y 2900/538* (2013.01)

(58) Field of Classification Search
CPC ..... E05F 1/1276; E05F 1/1292; E05F 1/1261; E05F 1/1253; E05F 3/02; E05F 3/10; E05F 3/20; E05Y 2201/41; E05Y 2201/412; E05Y 2201/414; E05Y 2201/416; E05Y 2201/40; E05Y 2201/46; E05Y 2900/30; E05Y 2900/302; E05Y 2900/304; E05Y 2900/308; E05Y 2900/502; E05Y 2900/538; E05Y 2201/212; E05Y 2201/25; E05Y 2201/422; E05Y 2201/484; E05Y 2201/21; E05Y 2201/224; E05Y 2201/71; E05Y 2201/712; E05Y 2201/716; E05Y 2201/722; E05Y 2800/102; E05Y 2800/45; E05D 11/0054; E05D 11/06; E05D 11/105; E05D 11/1014; E05D 11/1064; E05D 3/18; E05D 3/122; Y10T 16/5383; A47L 15/4265; B64D 11/003
See application file for complete search history.

(56) References Cited

U.S. PATENT DOCUMENTS

| | | | | |
|---|---|---|---|---|
| 2,272,230 A * | 2/1942 | Voorhees | ............. | E05F 1/1207 16/306 |
| 2,516,935 A | 8/1950 | Weaver | | |
| 2,626,420 A * | 1/1953 | Georges | ............... | E05F 1/1269 16/79 |
| 3,466,105 A * | 9/1969 | Guth | ..................... | A47L 15/507 312/274 |
| 3,820,866 A * | 6/1974 | Kaldenberg | ............. | E05F 5/08 312/276 |
| 4,342,135 A * | 8/1982 | Matsuo | ..................... | F16F 9/12 16/225 |
| 5,048,155 A * | 9/1991 | Hwang | ................. | E05F 1/1215 16/301 |
| 5,050,270 A * | 9/1991 | Burgei | ................. | E05F 1/1207 16/298 |
| 5,235,725 A * | 8/1993 | Rees | ...................... | E05F 1/1207 16/298 |
| 5,673,459 A * | 10/1997 | Baghdasarian | .......... | B64G 1/22 16/235 |
| 5,862,896 A * | 1/1999 | Villbrandt | ................. | E05F 3/14 188/293 |
| 6,164,592 A * | 12/2000 | Stephan | ................ | E05F 1/1215 16/278 |
| 6,993,808 B1 | 2/2006 | Bennett et al. | | |
| 7,845,053 B2 * | 12/2010 | Marsh | ..................... | E05D 11/06 16/357 |
| 8,186,638 B2 * | 5/2012 | Nishida | ..................... | B60R 7/10 248/292.12 |
| 8,245,353 B2 * | 8/2012 | Homner | ................ | E05F 1/1215 16/299 |
| 8,266,764 B2 * | 9/2012 | Costabel | ............... | E05F 1/1207 16/54 |
| 9,974,398 B2 * | 5/2018 | Simon | ..................... | E05D 7/0009 |
| 10,253,539 B2 * | 4/2019 | Kaiser | ..................... | E05F 1/1276 |
| 2002/0078529 A1 * | 6/2002 | Schwarz | ................... | E05F 3/20 16/387 |
| 2003/0204935 A1 * | 11/2003 | Kim | ......................... | E05F 3/20 16/280 |
| 2006/0130276 A1 * | 6/2006 | Clark | ........................ | E05D 5/06 16/299 |
| 2012/0005861 A1 | 1/2012 | Homner et al. | | |
| 2019/0169902 A1 * | 6/2019 | Hu | .......................... | E05D 11/06 |
| 2019/0169904 A1 * | 6/2019 | Hu | ............................. | E05F 3/20 |

FOREIGN PATENT DOCUMENTS

| | | | | |
|---|---|---|---|---|
| CN | 102312632 A | | 1/2012 | |
| CN | 203213762 U | * | 9/2013 | |
| DE | 3140039 A1 | * | 4/1983 | ......... A47L 15/4261 |
| DE | 202006014888 U1 | | 11/2006 | |
| EP | 0894933 A2 | | 2/1999 | |
| EP | 2405090 A2 | | 1/2012 | |
| EP | 2711493 A2 | | 3/2014 | |
| JP | S63308174 A | | 12/1988 | |

OTHER PUBLICATIONS

International Search Report and Written Opinion dated Dec. 19, 2019.

* cited by examiner

HINGE HAVING A TENSIONABLE SPRING ELEMENT

This application is the national phase of International Application No. PCT/EP2018/074441, filed on Sep. 11, 2018, which claims priority to and the benefit of German Patent Application No. 202017106060.8 filed on Oct. 6, 2017, the disclosures of which are hereby incorporated by reference in their entireties.

BACKGROUND

Field

The invention relates to a hinge having a tensionable spring element of the type used for compartment doors.

Related Art

Conventional airplane luggage compartments are usually equipped with springs whose spring tension determines the spring force-induced automatic opening of the closure flap, so as to cause the flap to move automatically from its closed position to a completely opened position.

For this purpose, luggage compartments are equipped with gas springs to facilitate opening the flaps and to retain the flaps in the open position. However, gas springs are sensitive to low temperatures. For example, in an airplane that has been cooled down very much, this may make it difficult to open storage compartments. Moreover, the springs of the hinge are located inside the luggage compartment where they can easily be damaged and will also diminish the available storage space.

EP 0 894 933 B1 describes a hinge comprising a pivotable hinge part and a fixed hinge part with a common hollow cylinder-like hinge axle which is firmly connected to the pivotable hinge part and is rotatably mounted in an axle bearing. The axle bearing body is rigidly connected to the fixed hinge part. A torsion spiral spring, both ends of which are fixed, is arranged in the hinge axle. The tension of the spring can be set by adjusting one of its two fixed ends. The loaded spring facilitates opening the flap, and a damping device ensures a decelerated opening action of the flap.

Furthermore, EP 2 405 090 B1 discloses an arrangement which makes it easy to set the tension of a torsion spiral spring of a hinge of this type without having to reinstall the spring in the hinge.

A well-known problem of airplane luggage compartments is that the hinges mounted on one or either side of each compartment take up not a small part of the available load volume of the luggage compartment and thus reduce the loadable storage space. The hinges, especially the springs, may be damaged by the items loaded into the compartments, if they are not fitted with hinge covers which in turn take up space and complicate assembly and maintenance. The configuration and dimensions of generic hinges make it impossible to integrate them into the narrow vertical side walls between the luggage storage boxes.

SUMMARY

It is the object of the invention to further develop a hinge of the type specified in the preamble of claim 1 such that the hinge forms a very compact and space-saving unit.

This object is accomplished by the characteristic features of claim 1 in conjunction with the features of its preamble.

The dependent claims relate to advantageous embodiments of the invention.

According to the invention, it is contemplated for the fixed hinge part to have two bearings which have their respective axes arranged at a distance from each other, wherein the pivotable hinge part mounted on the first bearing is adapted to be driven by means of a tensionable spring element mounted on the second bearing. The two bearings are formed independently of one another and are positioned offset relative to one another, in particular in the same plane. Therefore, the pivot axes of the bearings are not concentric.

It is possible to use different designs of the spring element. For example, the spring element can be designed as a torsion spiral spring, the coils of which are wound as a cylindrical spiral and whose spring ends are bent like legs, to facilitate mounting and thus tensioning of the spring.

The spring element may also be a flat spiral spring made of strip or flat material, in particular it may be designed as a flat spiral spring with Archimedean coils. Starting from the radially inner end of the spring, the coils run spirally in one plane, with the radially inner end and the radially outer end of the flat spiral spring being bent and adapted to be clamped.

In an advantageous embodiment of the invention, the pivotable hinge part is designed as a bearing bushing. It is possible to form the pivotable hinge part as a hinge leaf with a hinge arm, wherein the end remote from the hinge leaf is formed into a bearing bushing which is arranged on the first bearing of the fixed hinge part. A sliding pin is formed on the first bearing of the fixed hinge part, and so the pivotable hinge part and the fixed hinge part can be connected positively by means of a plain bearing. The axle of the first bearing defines the opening movement of the flap. It is possible to arrange a damper on the hinge axle. The damper advantageously ensures a controlled upward pivoting movement of the pivotable hinge part, which movement, for safety reasons, is smooth and not too fast. Preferably, the damper is mounted positively in the bearing bushing of the pivotable hinge part. This has the advantage that it is mounted in a space-saving manner, thus ensuring a narrow hinge.

Preferably, a section of the bearing bushing of the pivotable hinge part has a toothing formed thereon, which allows a force to be transmitted to the pivotable hinge part.

Preferably, both the tensionable spring element and a component having a toothing are arranged on the second bearing of the fixed hinge part. The tensionable spring element can be connected to the toothed component, thus transmitting the torque of the anchorable, tensionable spring element to the toothed component.

In accordance with an advantageous embodiment of the invention, the tensionable spring element, which is arranged in a different bearing in each case, and the pivotable hinge part are connected to one another by means of a mechanical transmission through which the torque of the spring element can be transmitted to the pivotable hinge part. Preferably, the torque is transmitted by means of a gear drive. However, it is also possible for the torque to be transmitted by means of a lever or a toothed belt drive. The toothing of the bearing bushing and the toothing of the component arranged on the second bearing are arranged so as to mesh in a positive-locking manner and without slippage. This ensures the indirect transmission of torque from the spring element to the pivotable hinge part.

Preferably, the tensionable spring element is actively connected to a torque adjustment unit. The torque adjustment unit is designed so as to be positively mounted on the second bearing, whereby one end of the spring element can be connected to the torque adjustment unit. An adjusting screw is located on a toothed portion of the torque adjustment unit. The shaft of the adjusting screw meshes with the toothed torque adjustment unit in several places simultaneously, whereby a rotational movement of the adjusting screw causes a relative movement of the torque adjustment unit. The spring element can be pretensioned by turning the torque adjustment unit and by means of the position of the meshing teeth of the bearing bushing and of the component arranged on the second bearing. The adjusting screw ensures that the pretension setting is maintained.

A stop for the pivotable hinge part is preferably formed on the fixed hinge part. It is possible for the stop to comprise a screw and for the impact of the pivotable hinge part to be damped by means of a spring arranged on the screw. The screw can be used for a fine adjustment of the open position of the hinge.

According to a preferred embodiment of the invention, the fixed hinge part is designed as a housing within which the hinge is located. This advantageously protects the mechanical components of the hinge from dirt and damage. It is possible to make the housing of plastic, which will result in a low weight and a nevertheless robust design of the housing. Plastic parts can be manufactured to have a high degree of functionality. For example, the housing can be designed with a cover that is form-fitted, friction-locked or material-locked to the housing.

Preferably, all the individual components of the overall hinge mechanism are accommodated within the housing. The housing holds the individual components together. The housing may have features such as recesses, walls and/or supports that hold together, guide and/or secure the components. It is possible for the housing to have openings through which the adjusting screw and the stop screw can be accessed for adjustment.

According to the invention, the first bearing and the second bearing are arranged offset relative to one another with respect to the pivot axes. Preferably, the pivot axes of the two bearings are aligned in parallel.

Additional advantages and possible applications of the present invention may be gathered from the description which follows, in which reference is made to the embodiments illustrated in the drawings.

Throughout the description, the claims and the drawings, those terms and associated reference signs are used as are indicated in the list of reference signs below. In the drawings:

DETAILED DESCRIPTION

The hinge 10 comprises a pivotable hinge part 12 and a fixed hinge part 14 which has two bearings 16, 18 formed in it.

Figure 1:
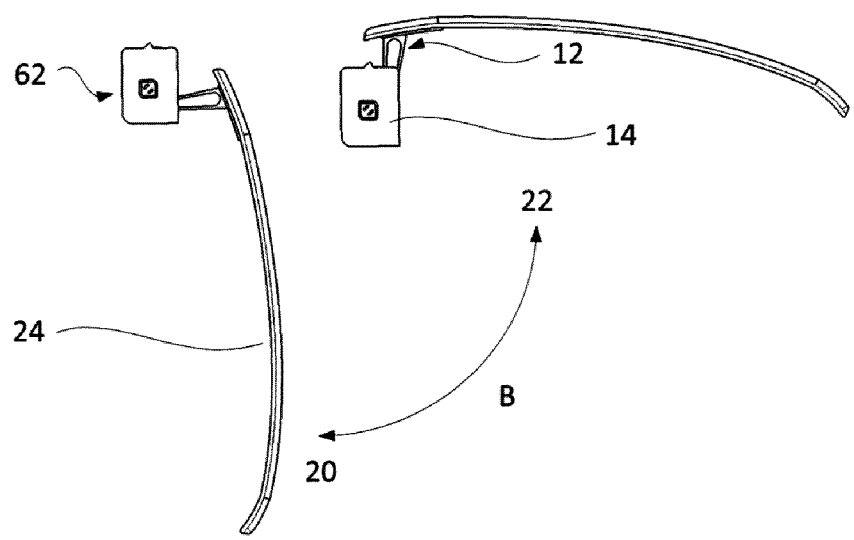
FIG. 1 is a lateral view of the hinge according to the invention, in open and closed positions thereof.

As shown in FIG. 1, the hinge 10 moves automatically from a closed position 20 to an open position 22 by means of spring tension.

According to the first embodiment of the invention shown in FIG. 2 to FIG. 5, the hinge 10 is designed to have a first bearing 16 and a second bearing 18 on the fixed hinge part 14. In the first bearing 16, the pivotable hinge part 12 is pivotably mounted about a pivot axis $S_1$. The pivot axis $S_1$ defines the opening movement B of the flap 24. In the present case, the pivotable part 12 is designed as a hinge arm 26 with a hinge leaf 28 that can be connected to the flap 24. Preferably, on the end facing away from the hinge leaf 28, the hinge arm 26 has a bearing bushing 30 that can be positively connected to a bearing journal 32 formed on the first bearing 16. The pivotable hinge part 12 and the fixed hinge part 14 are thus connected by means of a plain bearing. On the second bearing 18, the fixed hinge part 14 is formed into a hollow cylinder 36 in which an axle tube 38 is arranged. The second bearing 18 rotates about the pivot axis $S_2$, which is arranged at a distance from, and offset relative to, the pivot axis $S_1$ of the first bearing 16.

Figure 4:
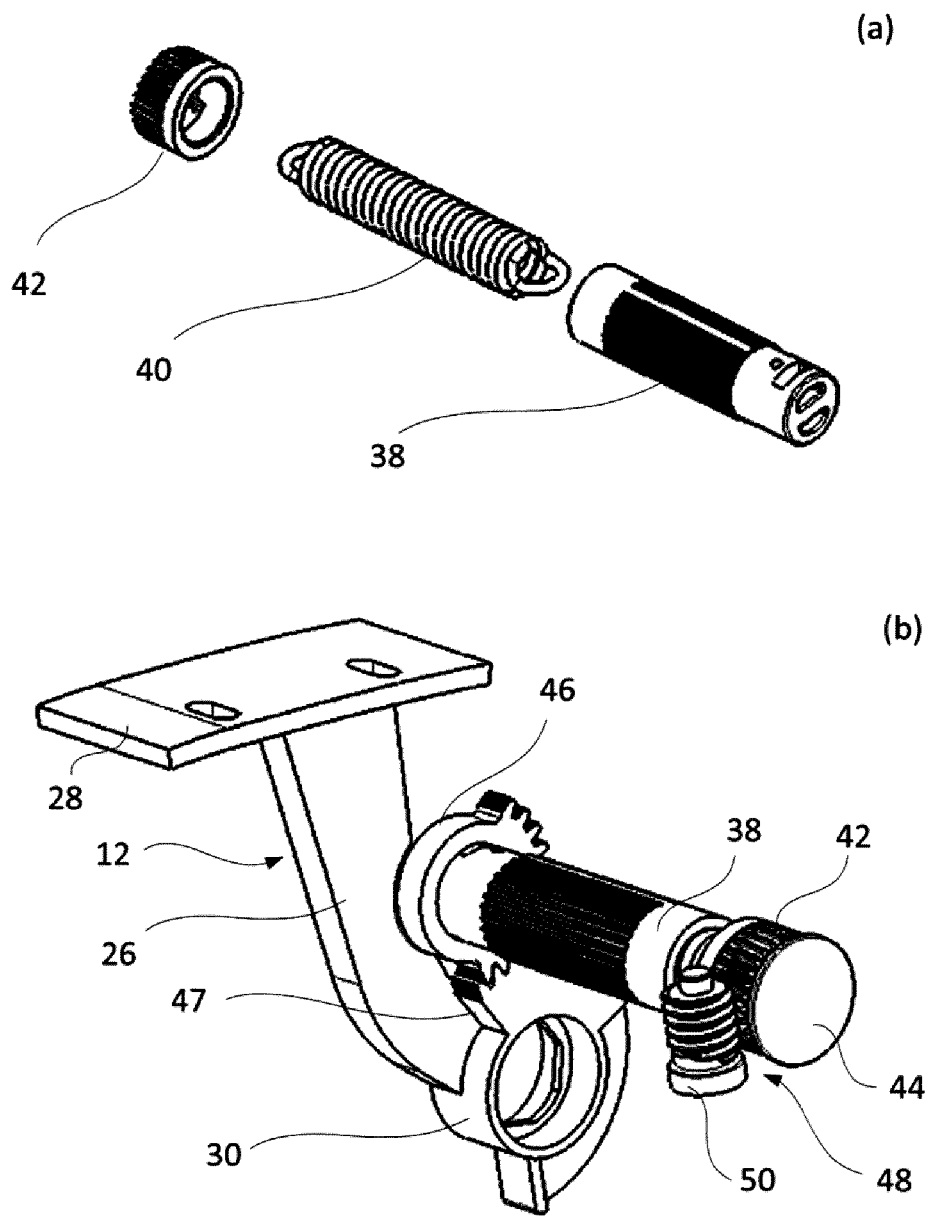
FIG. 4 is a detail view of the tensionable spring element and of the power transmission to the pivotable hinge part.

In the embodiment illustrated in FIG. 4, the tensionable spring element 34 is designed as a torsion spiral spring 40. The coils of the torsion spiral spring 40 are arranged in the form of a cylindrical spiral and the ends of the spring are bent in the manner of legs. This makes for easy mounting and tensioning of the torsion coil spring 40. The torsion coil spring 40 is disposed within the axle tube 38. At the end remote from the fixed hinge part 14, a torque adjustment unit 42 can be positively connected to the torsion coil spring 40 and the axle tube 38. A pin passes through the end of the spring, thus securing the connection of the torsion coil spring 40 to the axle tube 38 and the torque adjustment unit 42. The torque adjustment unit 42 is adapted to be closed with a cover 44. Mounted on the second bearing 18 is a component 46 in the form of a gear wheel. It is adapted to be positively connected to the axle tube 38. One of the ends of the tensionable torsion coil spring 40 mounted in the axle tube 38 is anchored in the component 46 by means of a pin. The respective spring ends of the torsion coil spring 40 are thus anchored in different components. The required torque of the torsion coil spring 40 can be adjusted by means of a so-called worm gear 48. The worm gear 48 comprises the torque adjustment unit 42 in the form of a worm wheel and an adjusting screw 50. The axis of the adjusting screw 50 and the axis of the torque adjustment unit 42 are offset by 90° relative to one another, with the shaft of the adjusting screw 50 meshing with the toothing of the torque adjustment unit 42. If the adjusting screw 50 is turned, this operatively causes the torque adjustment unit 42 to rotate, which in turn also rotates the torsion coil spring 40, thus allowing the latter to be tensioned.

The torque of the torsion coil spring 40 is indirectly transmitted to the pivotable hinge part 12 by means of a power transmission, which is designed as a gear drive in the present case. The toothed component 46 arranged on the second bearing 18 is adapted to mesh positively and without slippage with the toothing 47 of the bearing bushing 30, thus enabling the automatic spring force-induced opening of the hinge 10. The torsion coil spring 40 can be pretensioned to the required torque. Pretensioning of the spring is accomplished by appropriately positioning the toothing 47 of the bearing bushing 30 on the gear wheel of the component 46 mounted on the second bearing 18 and by turning the torque adjustment unit 42 by means of the adjusting screw 50. A damper 52 is positively mounted on the pivotable hinge part 12 and allows a controlled opening movement B of the pivotable hinged part 12, thus ensuring that the flap 24 swings up smoothly and not too quickly.

Figure 2:
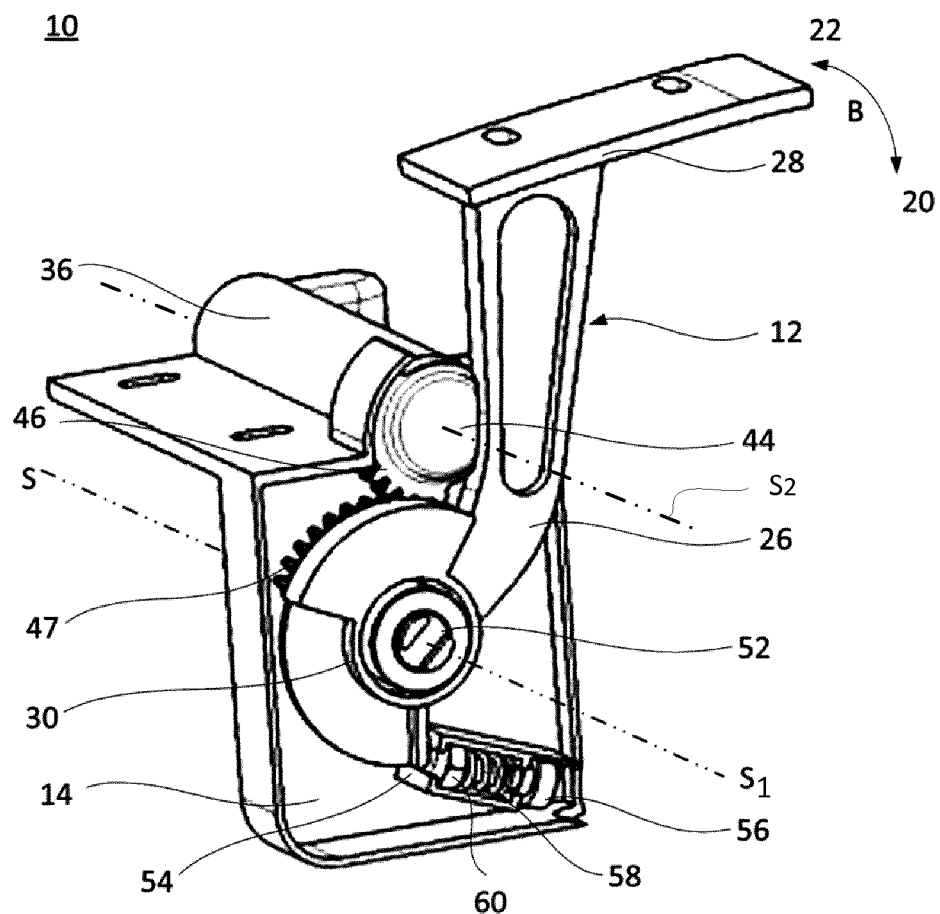
FIG. 2 is a top view of the mechanical components of the hinge.

As can be seen in particular from FIG. 2, a stop 54 for the pivotable hinge part 12 is provided on the fixed hinge part 14. The stop 54 comprises a stop screw 56 with a damping spring 58 arranged on it. The stop screw 56 can be used for the fine adjustment of the open position 22 of the hinge 10. Preferably, a nut 60 is positively arranged above the spring 58 so as to prevent the stop screw 56 from rotating of its own accord.

Figure 5:
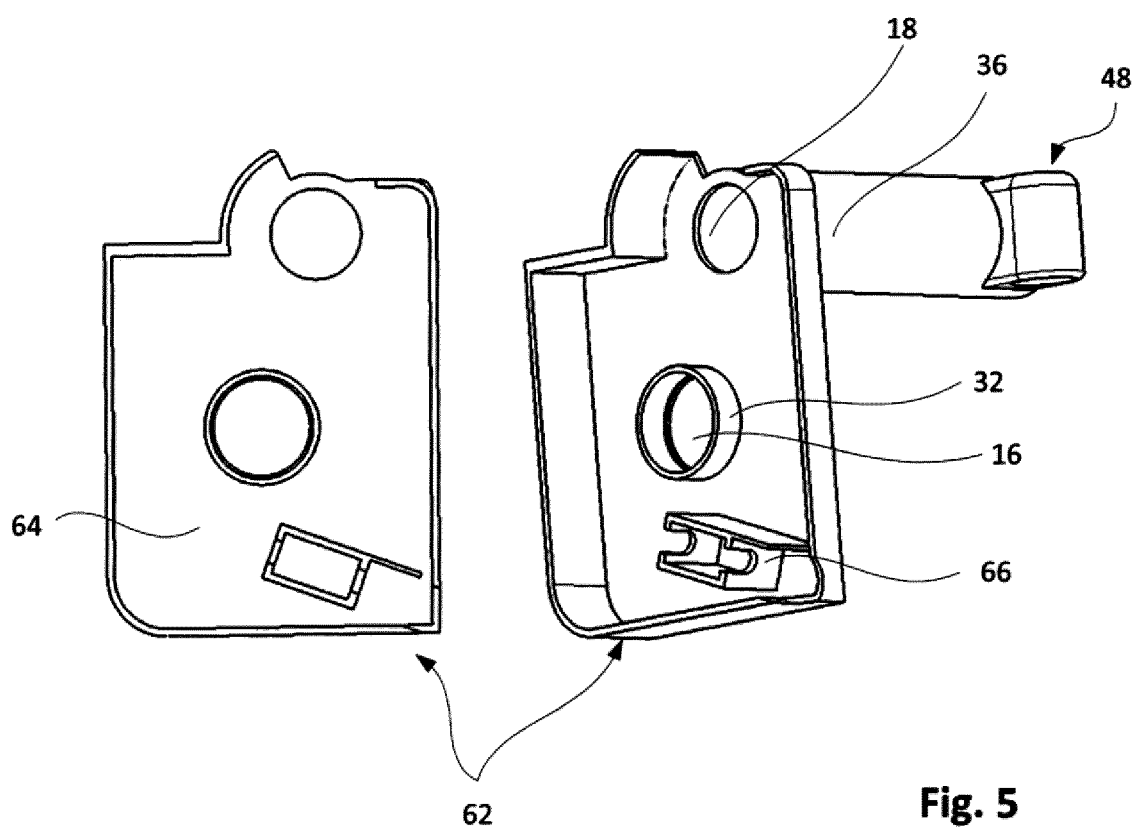
FIG. 5 is a view of the open housing.

In the embodiment illustrated in FIG. 5, the fixed hinge part 14 is designed as a housing 62 with a cover 64. The housing 62 protects the mechanical components of the hinge 10 from damage, holds the individual components of the overall mechanism of the hinge 10 together and secures the individual components in place by means of projections 66. It is possible to make the housing 62 of plastic, and to connect the cover 64 to the housing 62 in a positive, force-locking or material-locking manner. The adjusting screw 50 and the stop screw 56 are accessible through openings in the housing 62. The compact design of the hinge 10 ensures that it can be placed in the side wall between two luggage boxes, with the hollow cylinder 36 being horizontally located in the region of the ceiling plate of the luggage box. It can be integrated either within or above the ceiling plate.

Figure 3:
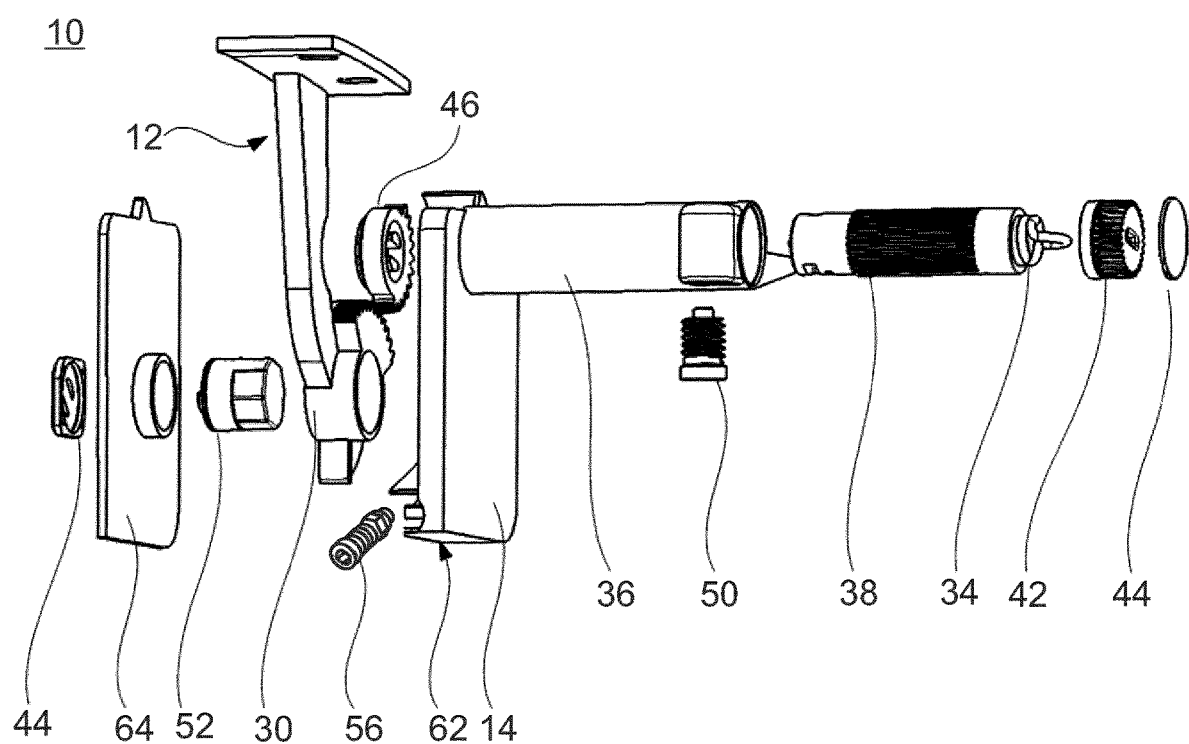
FIG. 3 is an exploded view illustrating the individual components of the hinge
Figure 6:
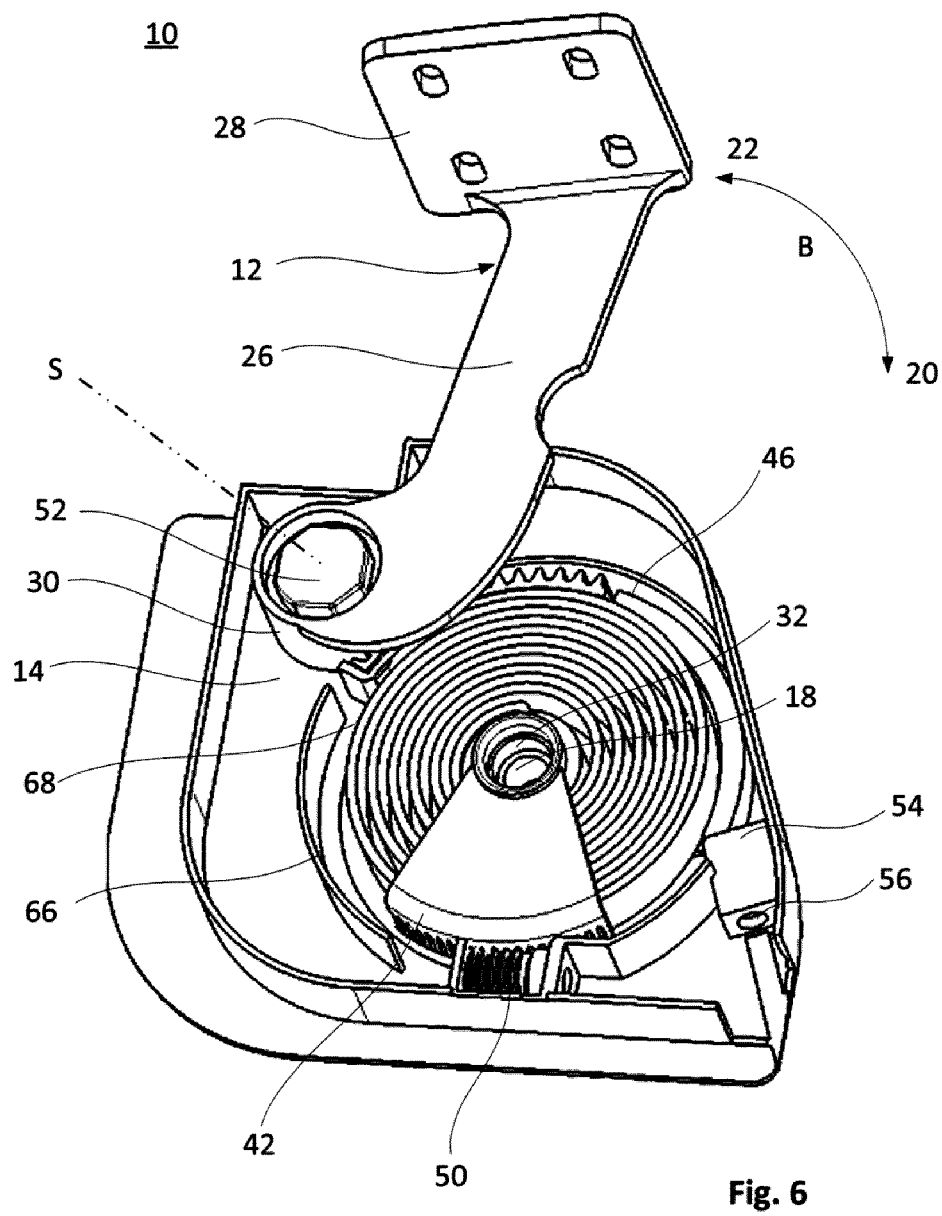
FIG. 6 is a top view of the mechanical components of the hinge having a flat spiral spring.
Figure 7:
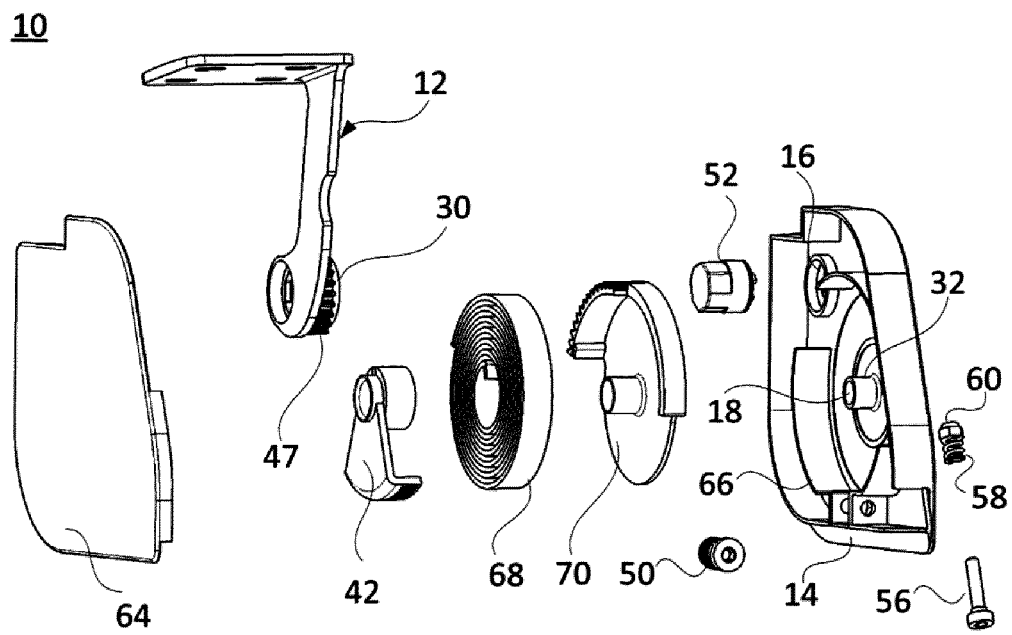
FIG. 7 is an exploded view of the hinge according to the invention having a flat spiral spring.

The second embodiment of the invention as illustrated in FIG. 6 and FIG. 7 essentially corresponds to the first embodiment of FIG. 2 and FIG. 3. In comparison to the first embodiment, the spring element 34 of this embodiment is designed as a flat spiral spring 68. It is arranged on the second bearing 18, together with a component 46 designed as a driving wheel 70. A portion of the driving wheel 70 is designed as a gear wheel and is loosely mounted on the second bearing 18, with the radially outer end of the flat spiral spring 68 being secured in the driving wheel 70. A torque adjustment unit 42 is arranged on the flat spiral spring 68 and the radially inner end of the flat spiral spring 68 is connected to the torque adjustment unit 42, for example in a groove. The pivotable hinge part 12 arranged on the first bearing 16 is designed as a bearing bushing 30 with a toothing 47. The toothing 47 meshes positively with the toothed portion of the driving wheel 70. The flat spiral spring 68 can be pretensioned to the required torque by appropriately positioning of the toothing 47 of the bearing bushing 30 on the gear wheel of the driving wheel 70 and by turning the torque adjustment unit 42 by means of an adjusting screw 50 whose shaft meshes with the toothed portion of the torque adjustment unit 42. In the present embodiment, the flat spiral spring 68 acts clockwise on the driving wheel 70 which moves the hinge arm 26 counterclockwise to the open position 22.

LIST OF REFERENCE SIGNS 10 hinge
12 pivotable hinge part
14 fixed hinge part
16 first bearing
18 second bearing
20 closed position
22 opened position
24 flap
26 hinge arm
28 hinge leaf
30 bearing bushing
32 bearing journal
34 tensionable spring element
36 hollow cylinder
38 axle tube
40 torsion spiral spring
42 torque adjustment unit
44 cover
46 component with gear wheel
47 toothing
48 worm gear
50 adjusting screw
52 damper
54 stop
56 stop screw
58 spring
60 nut
62 housing
64 cover of housing
66 projections
68 flat spiral spring
70 driving wheel
S pivot axis
B opening movement

The invention claimed is:

1. Hinge (10) comprising a pivotable hinge part (12), a fixed hinge part (14) and a tensionable spring element (34), wherein the fixed hinge part (14) has a first bearing (16) as well as a second bearing (18) formed therein, with the pivot axes ($S_1$, $S_2$) of the bearings (16, 18) being offset relative to one another, wherein the pivotable hinge part (12) is mounted on the fixed hinge part (14) via the first bearing (16) so as to be pivotable about a pivot axis ($S_1$), the tensionable spring element (34) is mounted on the fixed hinge part (14) via the second bearing (18) and the tensionable spring element (34) is designed as a flat spiral spring (68), wherein the flat spiral spring (68) is arranged on the second bearing (18), together with a component (46) designed as a driving wheel (70), a portion of the driving wheel (70) is designed as a gear wheel and mounted on the second bearing (18), with the end of the flat spiral spring (68) being secured in the driving wheel (70), the pivotable hinge part (12) arranged on the first bearing (16) is designed as a bearing bushing (30) with a toothing (47), the toothing (47) meshes positively with the toothed portion of the driving wheel (70), the radially outer end of the flat spiral spring (68) being secured in the driving wheel (70), a torque adjustment unit (42) is arranged on the flat spiral spring (68) and the radially inner end of the flat spiral spring (68) is connected to the torque adjustment unit (42), the flat spiral spring (68) can be pretensioned to the required torque by appropriately positioning of the toothing (47) of the bearing bushing (30) on the gear wheel of the driving wheel (70) and by turning the torque adjustment unit (42) by means of an adjusting screw (50), which meshes with a toothed portion of the torque adjustment unit (42).

2. Hinge according to claim 1, wherein a damper on the hinge axle is arranged, which is mounted positively in the bearing bushing of the pivotable hinge part.

3. Hinge according to claim 1, wherein the fixed hinge part (14) has an adjustable stop (54) for the pivotal hinge part formed thereon.

4. Hinge according to claim 1, wherein the fixed hinge part (14) is designed to form a housing (62).

5. Hinge according to claim 1, characterized in that a portion of the pivotable hinge part (12) located on the first bearing (16) is formed as a bearing bushing (30).

6. Hinge according to claim 1, characterized in that the fixed hinge part (14) has an adjustable stop (54) formed thereon.

7. Hinge according to claim 1, wherein the pivotable hinge part (12) is loaded counterclockwise if the coil spring (68) acts clockwise on the driving wheel (70).

* * * * *